United States Patent
Chen et al.

(10) Patent No.: US 9,855,850 B2
(45) Date of Patent: Jan. 2, 2018

(54) VARIABLE CARRIER SWITCHING FREQUENCY CONTROL OF VARIABLE VOLTAGE CONVERTER

(71) Applicant: FORD GLOBAL TECHNOLOGIES, LLC, Dearborn, MI (US)

(72) Inventors: Lihua Chen, Northville, MI (US); Shailesh Shrikant Kozarekar, Novi, MI (US); Yan Zhou, Canton, MI (US); Mohammed Khorshed Alam, Dearborn, MI (US); Shahram Zarei, Farmington Hills, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 14/968,273

(22) Filed: Dec. 14, 2015

(65) Prior Publication Data

US 2017/0166064 A1 Jun. 15, 2017

(51) Int. Cl.
*B60L 11/18* (2006.01)
*H02M 3/158* (2006.01)
*H02M 1/14* (2006.01)

(52) U.S. Cl.
CPC .............. *B60L 11/18* (2013.01); *H02M 1/14* (2013.01); *H02M 3/158* (2013.01)

(58) Field of Classification Search
CPC .......... B60L 11/19; H02M 3/158; H02M 1/14
See application file for complete search history.

(56) References Cited

U.S. PATENT DOCUMENTS

| 7,285,939 B2 | 10/2007 | Ito |
| 8,995,156 B2 | 3/2015 | Gu et al. |
| 2012/0313430 A1 | 12/2012 | Wu et al. |

*Primary Examiner* — Robert Deberadinis
(74) *Attorney, Agent, or Firm* — David Kelley; Brooks Kushman P.C.

(57) ABSTRACT

A voltage converter includes a switch having a switching loss that decreases as a switching frequency of the switch decreases. The voltage converter further includes a controller programmed to vary the switching frequency based on a duty cycle of the switch and a current input to the switch to reduce switching losses or reduce a ripple current magnitude.

20 Claims, 4 Drawing Sheets

VARIABLE CARRIER SWITCHING FREQUENCY CONTROL OF VARIABLE VOLTAGE CONVERTER

TECHNICAL FIELD

This application is generally related to controlling a variable voltage converter.

BACKGROUND

Electrified vehicles include hybrid electric vehicles (HEV) and battery electric vehicles (BEV). Electrified vehicles include a traction battery to store energy to be used for propulsion and other purposes. The traction battery is configured to operate in a particular voltage range. However, improved performance of electric machines may be achieved by operating in a different voltage range, typically at higher voltages than the traction battery. Many electrified vehicles include a variable voltage converter to convert the voltage of the traction battery to a voltage level desired by the electric machines.

SUMMARY

In some configurations, a variable voltage converter includes a switch having a switching loss that decreases as a switching frequency of the switch decreases. The variable voltage converter also includes a controller programmed to, in response to an increase in magnitude of a difference between an operating duty cycle value of the switch and a predetermined duty cycle value at which a predicted ripple current magnitude and the switching frequency are at respective maximums, reduce the switching frequency to decrease the switching loss.

Some configurations may include one or more of the following features. The variable voltage converter in which the controller is further programmed to, in response to a decrease in the magnitude of the difference, increase the switching frequency to decrease a ripple current magnitude. The variable voltage converter in which the controller is further programmed to, in response to the magnitude of the difference being less than a predetermined magnitude, set the switching frequency to the maximum switching frequency. The variable voltage converter in which the controller is further programmed to reduce the switching frequency by predetermined frequency steps based on the magnitude of the difference. The variable voltage converter in which the controller is further programmed to reduce the switching frequency in response to a decrease in a current input to the switch. The variable voltage converter in which the operating duty cycle is based on a ratio of an input voltage to an output voltage of the variable voltage converter. The variable voltage converter in which the controller is further programmed to limit the switching frequency to be between the maximum switching frequency and a predetermined minimum frequency. The variable voltage converter in which the predetermined minimum frequency is a frequency level that is greater than a predetermined switching frequency of an inverter that is coupled to an output of the variable voltage converter.

In some configurations, a variable voltage converter includes a switch having a switching loss that decreases as a switching frequency of the switch decreases. The variable voltage converter also includes a controller programmed to set the switching frequency to a predetermined maximum frequency when a current input to the switch is greater than a predetermined maximum current and, in response to the current input being less than the predetermined maximum current, reduce the switching frequency based on a magnitude of the current input.

Some configurations may include one or more of the following features. The variable voltage converter in which the controller is further programmed to reduce the switching frequency by predetermined frequency steps based on the magnitude of the current input. The variable voltage converter in which the controller is further programmed to reduce the switching frequency based on a magnitude of a difference between a duty cycle of the switch and a predetermined duty cycle value at which a ripple current magnitude and the switching frequency are at respective maximums. The variable voltage converter in which the switching frequency decreases as the magnitude of the current decreases. The variable voltage converter in which the current input is based on an input power to the variable voltage converter.

In some configurations, a method of controlling a variable voltage converter in a vehicle includes decreasing, by a controller, a frequency of a control signal for a switch to reduce switching losses in response to an increase in a magnitude of a difference between an operating duty cycle of the control signal and a predetermined duty cycle at which a predicted ripple component magnitude and the frequency are at respective maximums. The method also includes outputting, by the controller, the control signal.

Some configurations may include one or more of the following features. The method may include increasing, by the controller, the frequency of the control signal toward the maximum frequency in response to a decrease in the magnitude of the difference to decrease a ripple component magnitude. The method may include limiting, by the controller, the frequency to be between the maximum frequency and a predetermined minimum frequency. The method in which the predetermined minimum frequency is a frequency level that is greater than a predetermined switching frequency of an inverter that is coupled to an output of the voltage converter. The method may include setting, by the controller, the frequency to the maximum frequency in response to the magnitude of the difference being less than a predetermined magnitude. The method may include decreasing, by the controller, the frequency in response to a current input to the switch being less than a predetermined maximum current to reduce switching losses. The method may include increasing, by the controller, the frequency in response to the current input increasing toward the predetermined maximum current to reduce a ripple component magnitude.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
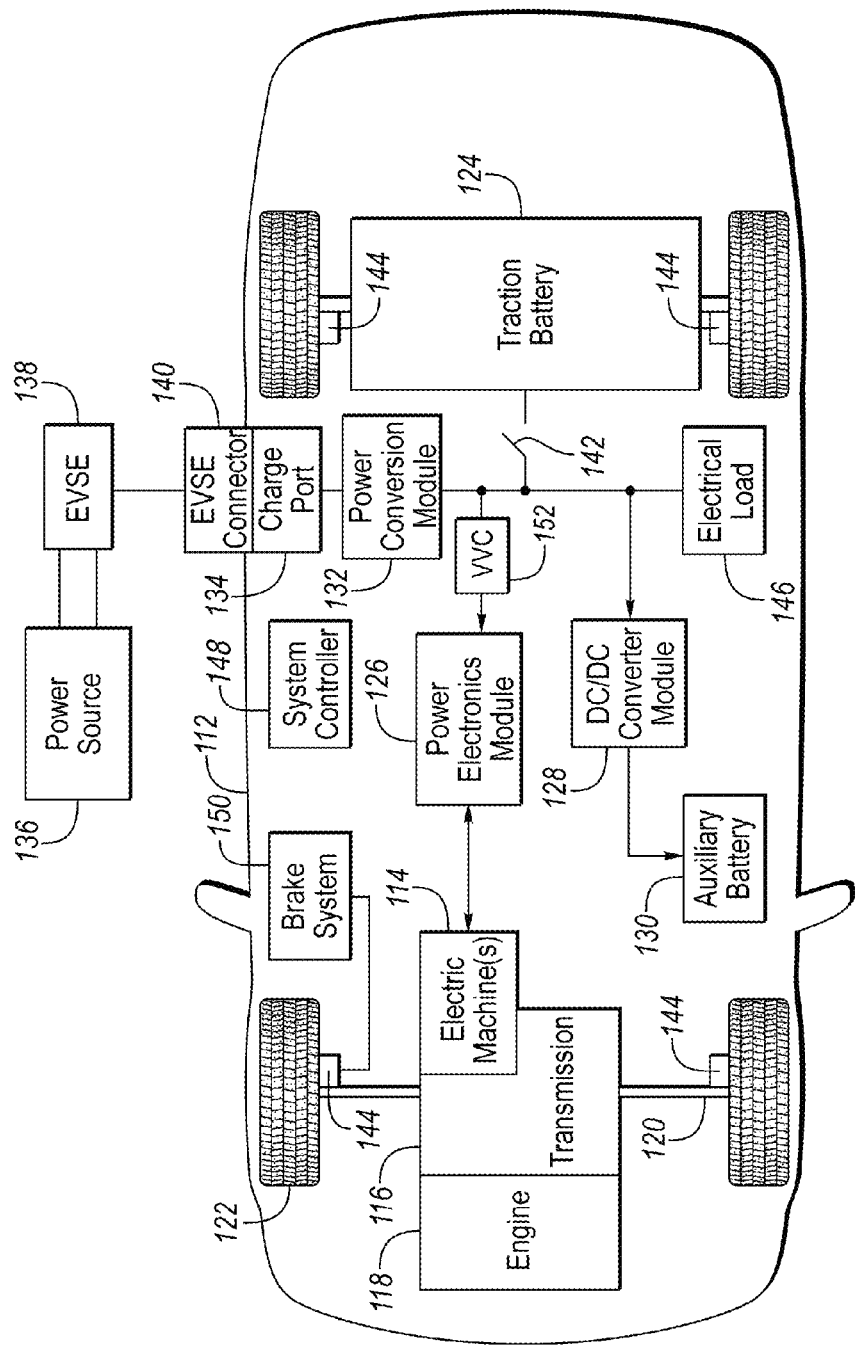
FIG. 1 is a diagram of a hybrid vehicle illustrating typical drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
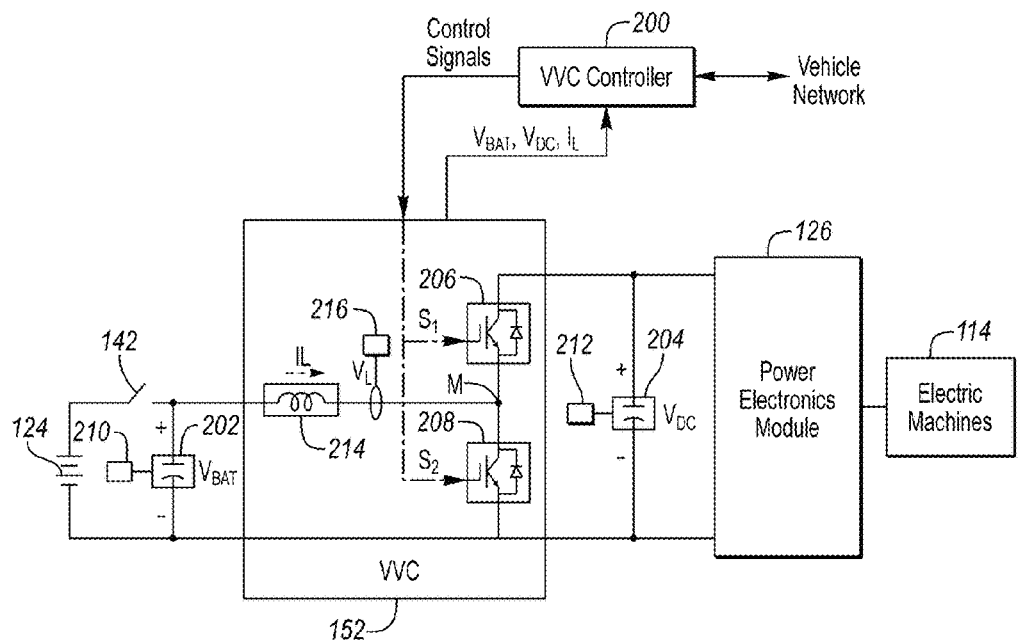
FIG. 2 is a diagram of a possible variable voltage converter configuration.

FIG. 2 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, $V_{dc}^*$. The VVC controller 200 may determine, based on the electrical parameters and the voltage reference, $V_{dc}^*$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The particular control signal at which the VVC 152 is operated may be directly related to the amount of voltage boost to be provided by the VVC 152.

The output voltage of the VVC 152 may be controlled to achieve a desired reference voltage. In some configurations, the VVC 152 may be a boost converter. In a boost converter configuration in which the VVC controller 200 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \quad (1)$$

The desired duty cycle, D, may be determined by measuring the input voltage (e.g., traction battery voltage) and setting the output voltage to the reference voltage. The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

With reference to FIG. 2, the VVC 152 may boost or "step up" the voltage potential of the electrical power provided by the traction battery 124. The traction battery 124 may provide high voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204 may be electrically coupled between the output terminals of the VVC 152. The output capacitor 204 may stabilize the bus voltage and reduce voltage and current ripple at the output of the VVC 152.

Further with reference to FIG. 2, the VVC 152 may include a first switching device 206 and a second switching device 208 for boosting an input voltage to provide the boosted output voltage. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition. The switching devices may also have associated conduction losses that occur when the device is switched on.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214 may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal ($I_L$) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216.

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}, V_{dc}, I_L, V_{dc}^*$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at the specified duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle. The control signals for the two switches 206, 208 may be complementary. That is, the control signal sent to one of the switching devices (e.g., 206) may be an inverted version of the control signal sent to the other switching device (e.g., 208).

Figure 4:
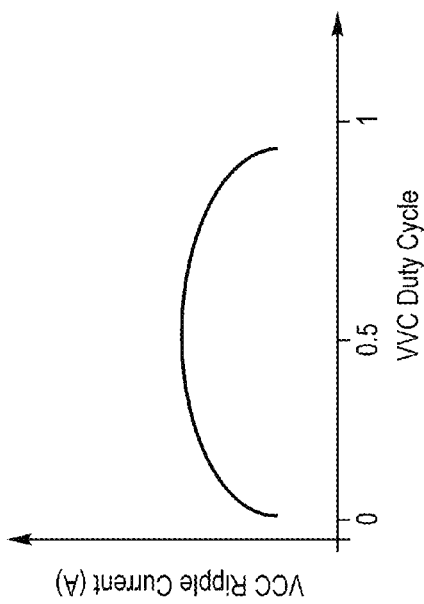
FIG. 4 is a graph depicting a possible relationship between ripple current and input current.
Figure 5:
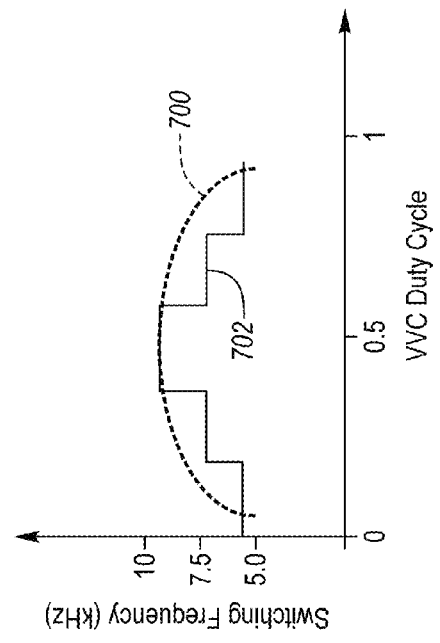
FIG. 5 is a graph depicting a possible relationship between ripple current and duty cycle.

The current that is controlled by the switching devices 206, 208 may include a ripple component that has a magnitude that varies with a magnitude of the current, and the duty cycle and switching frequency of the switching devices 206, 208. Relative to the input current, the worst case ripple current magnitude occurs during relatively high input current conditions. When the duty cycle is fixed, an increase in the inductor current causes an increase in magnitude of the ripple current as illustrated in FIG. 4. The magnitude of the ripple current is also related to the duty cycle. The highest magnitude ripple current occurs when the duty cycle equals 50%. The general relationship between the inductor ripple current magnitude and the duty cycle may be as shown in FIG. 5. Based on these facts, it may be beneficial to implement measures to reduce the ripple current magnitude under high current and mid-range duty cycle conditions.

When designing the VVC 152, the switching frequency and the inductance value of the inductor 214 may be selected to satisfy a maximum allowable ripple current magnitude. The ripple component may be a periodic variation that appears on a DC signal. The ripple component may be defined by a ripple component magnitude and a ripple component frequency. The ripple component may have harmonics that are in an audible frequency range that may add to the noise signature of the vehicle. Further, the ripple component may cause difficulties with accurately controlling devices fed by the source. During switching transients, the switching devices 206, 208 may turn off at the maximum inductor current (DC current plus ripple current) which may cause large voltage spike across the switching devices 206, 208. Because of size and cost constraints, the inductance value may be selected based on the conducted current. In general, as current increases the inductance may decrease due to saturation.

The switching frequency may be selected to limit a magnitude of the ripple current component under worst case scenarios (e.g., highest input current and/or duty cycle close to 50% conditions). The switching frequency of the switching devices 206, 208 may be selected to be a frequency (e.g., 10 kHz) that is greater than a switching frequency of the motor/generator inverter (e.g., 5 kHz) that is coupled to an output of the VVC 152. In some applications, the switching frequency of the VVC 152 may be selected to be a predetermined fixed frequency. The predetermined fixed frequency is generally selected to satisfy noise and ripple current specifications. However, the choice of the predetermined fixed frequency may not provide best performance over all operating ranges of the VVC 152. The predetermined fixed frequency may provide best results at a particular set of operating conditions, but may be a compromise at other operating conditions.

Increasing the switching frequency may decrease the ripple current magnitude and lower voltage stress across the switching devices 206, 208, but may lead to higher switching losses. While the switching frequency may be selected for worst case ripple conditions, the VVC 152 may only operate under the worst case ripple conditions for a small percentage of the total operating time. This may lead to unnecessarily high switching losses that may lower fuel economy. In addition, the fixed switching frequency may concentrate the noise spectrum in a very narrow range. The increased noise density in this narrow range may result in noticeable noise, vibration, and harshness (NVH) issues.

The VVC controller 200 may be programmed to vary the switching frequency of the switching devices 206, 208 based on the duty cycle and the input current. The variation in switching frequency may improve fuel economy by reducing switching losses and reduce NVH issues while maintaining ripple current targets under worst case operating conditions.

Figure 6:
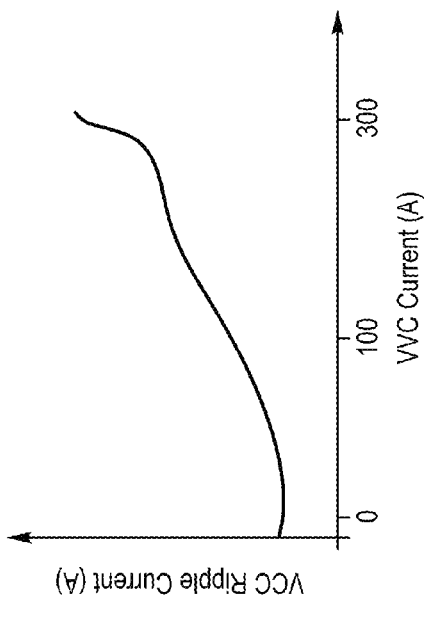
FIG. 6 is a possible relationship between switching frequency and current.

During relatively high current conditions, the switching devices 206, 208 may experience increased voltage stress. At a maximum operating current of the VVC 152, it may be desired to select a relatively high switching frequency that reduces the ripple component magnitude with a reasonable level of switching losses. The switching frequency may be selected based on the input current magnitude such that as the input current magnitude increases, the switching frequency increases. The switching frequency may be increased up to a predetermined maximum switching frequency. The predetermined maximum switching frequency may be a level that provides a compromise between lower ripple component magnitudes and higher switching losses. The switching frequency may be changed in discrete steps or continuously over the operating current range. FIG. 6 depicts the switching frequency as a function of the input current with a continuous curve 600 and a discrete step curve 602. As a magnitude of the current increases, the switching frequency may be increased.

The VVC controller 200 may be programmed to reduce the switching frequency in response to the current input being less than a predetermined maximum current. The predetermined maximum current may be a maximum operating current of the VVC 152. The change in the switching frequency may be based on the magnitude of the current input to the switching devices 206, 208. When the current is greater than the predetermined maximum current, the switching frequency may be set to a predetermined maximum switching frequency. As the current decreases, the magnitude of the ripple component decreases. By operating at lower switching frequencies as the current decreases, switching losses are reduced. The switching frequency may be varied based on the power input to the switching devices. As the input power is a function of the input current and the battery voltage, the input power and input current may be used in a similar manner.

Figure 7:
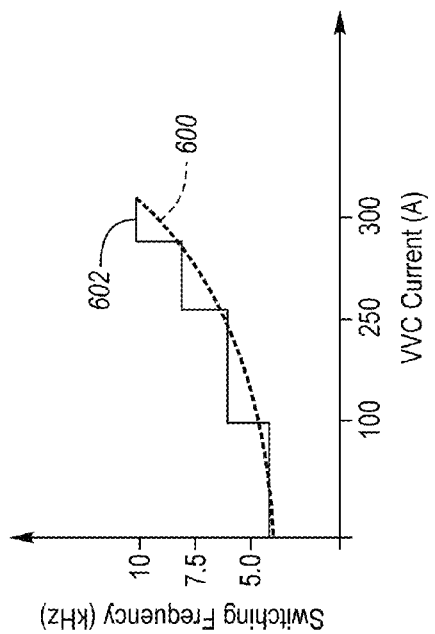
FIG. 7 is a possible relationship between switching frequency and duty cycle.

Since the ripple current is also affected by the duty cycle, the switching frequency may be varied based on the duty cycle. The duty cycle may be determined based on a ratio of the input voltage to the output voltage. As such, the switching frequency may also be varied based on the ratio between the input voltage and the output voltage. When the duty cycle is near 50%, the predicted ripple current magnitude is a maximum value and the switching frequency may be set to the predetermined maximum frequency. The predetermined maximum frequency may be a maximum switching frequency value that is selected to minimize the ripple current magnitude. The switching frequency may be changed in discrete steps or continuously over the duty cycle range. FIG. 7 depicts the switching frequency as a function of the duty cycle with a continuous curve 700 and a discrete step curve 702.

The VVC controller 200 may be programmed to reduce the switching frequency from the predetermined maximum frequency in response to a magnitude of a difference between the duty cycle and the duty cycle value (e.g, 50%) at which the predicted ripple component magnitude is a maximum. When the magnitude of the difference is less than a threshold, the switching frequency may be set to the predetermined frequency. When the magnitude of the difference decreases, the switching frequency may be increased toward the predetermined maximum frequency to reduce the ripple component magnitude. When the magnitude of the difference is less than a threshold, the switching frequency may be set to the predetermined maximum frequency.

The switching frequency may be limited to be between the predetermined maximum frequency and a predetermined minimum frequency. The predetermined minimum frequency may be a frequency level that is greater than a predetermined switching frequency of the power electronic module 126 that is coupled to an output of the voltage converter 152.

Figure 8:
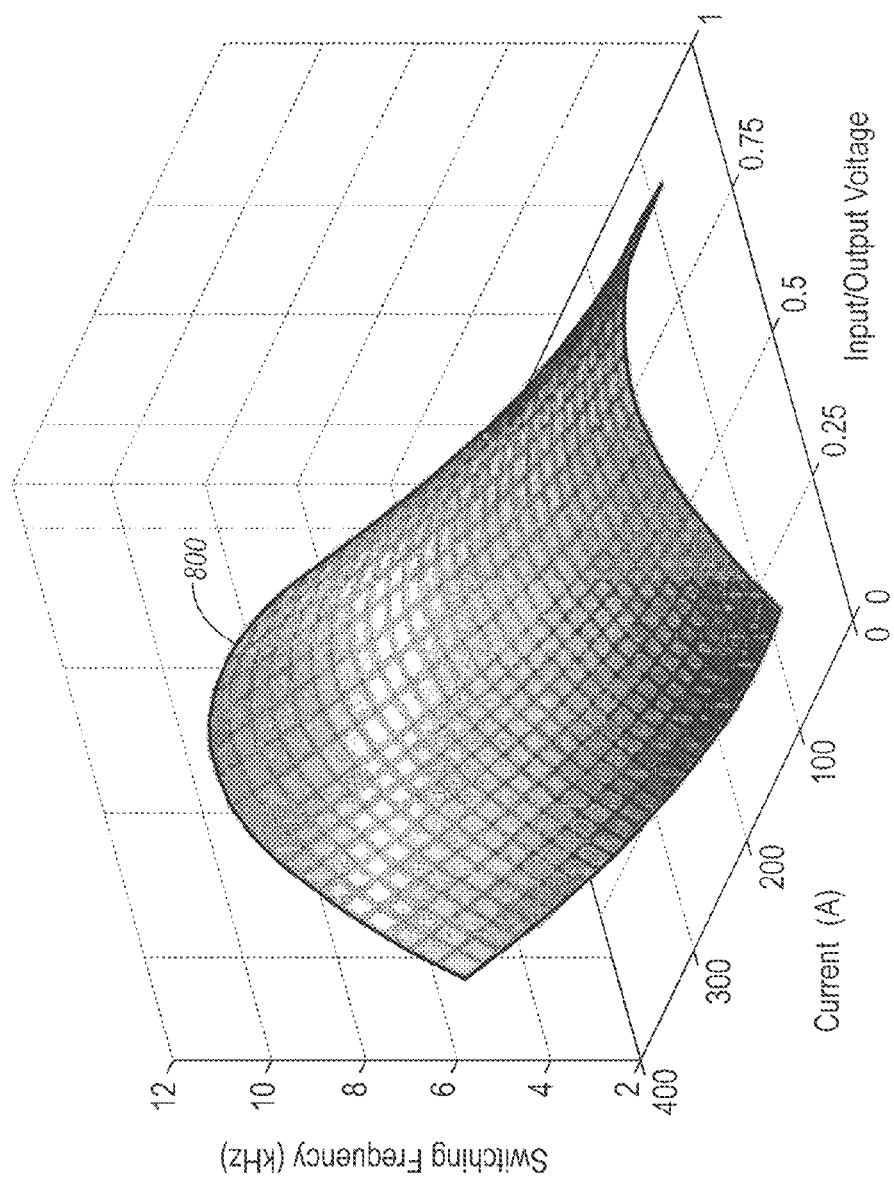
FIG. 8 is a possible surface that relates switching frequency to current and duty cycle.

In some configurations, the switching frequency may be varied as a function of both the input current and the duty cycle. The curves of FIG. 6 and FIG. 7 may be combined into a surface 800 as depicted by FIG. 8. The surface 800 may be implemented in the VVC controller 200 as a lookup table indexed by the input current and the duty cycle. The duty cycle may be represented as a ratio of the input voltage to the output voltage of the VVC. In the absence of a change in the duty cycle, the switching frequency may be increased as the current increases. In the absence of a change in the current, the switching frequency may be increased in response to a decrease in the distance of the duty cycle from a predetermined duty cycle (e.g., 50%).

Figure 3:
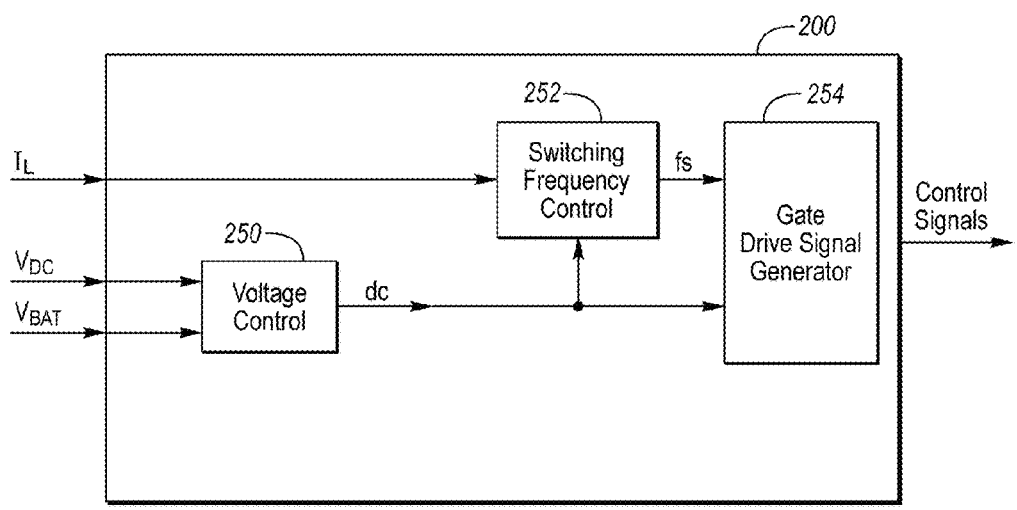
FIG. 3 is a block diagram of functions that may be implemented in a controller.

FIG. 3 depicts a block diagram of control logic that may be programmed in the VVC controller 200. A voltage control function 250 may be programmed in the VVC controller 200. The voltage control function 250 may process the DC bus voltage and traction battery voltage signals to determine a duty cycle output (dc) to achieve a predetermined voltage reference. For example, the voltage control function 250 may implement a proportional-integral control algorithm to adjust the duty cycle output to minimize an error between the voltage reference and the DC bus voltage. The duty cycle may be based on a ratio of the input voltage (e.g., traction battery voltage) to the output voltage (e.g., desired output voltage).

A switching frequency control function 252 may be programmed in the VVC controller 200. The switching frequency control function 252 may process the inductor current and the duty cycle value of the voltage control function 250 to determine a switching frequency (fs) for the switching devices 206, 208. For example, the switching frequency control function 252 may implement a lookup table corresponding to the surface 800 of FIG. 8. In some configurations, the switching frequency control function 252 may be implemented as equations having the duty cycle and the inductor current as inputs.

A gate drive signal generator function 254 may be configured in the VVC controller 200. The gate drive signal generator function 254 may be configured to convert the switching frequency and the duty cycle into a signal to drive the switching devices 206, 208. The control signals may be square wave signals having frequency and duty cycle as defined by the inputs (e.g., fs and dc) to the gate drive signal generator function 254. The gate drive signal generator function 254 may be configured to generate the control signals with a predetermined voltage or current amplitude to drive the switching devices 206, 208.

The VVC controller 200 may be programmed to decrease the frequency of the control signals in response to an increase in a magnitude of a difference between a duty cycle of the control signal and a duty cycle value at which a predicted ripple component magnitude is a maximum (e.g., 50%). The frequency may be limited to a frequency value greater than a switching frequency of the power electronics module 126. The frequency may be increased in response to a decrease in the magnitude of the difference. When the magnitude of the difference is near zero, the frequency may be set to a predetermined frequency which may be a maximum switching frequency value.

The VVC controller 200 may be programmed to decrease the frequency in response to an increase in a difference between a predetermined maximum current value at which the predicted ripple component magnitude is a maximum and a magnitude of the current through the switching devices 206, 208. The frequency may be increased in response to a decrease in the difference.

Varying the switching frequency allows the switching losses of the VVC 152 to be reduced over a range of operating conditions. Reduced switching losses may translate into better fuel economy since less energy is lost in the VVC 152. Further, the spectrum of noise from the VVC 152 may be spread out over a wider range of frequencies leading to improved NVH characteristics of the vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A variable voltage converter comprising:
   a switch having a switching loss that decreases as a switching frequency of the switch decreases; and
   a controller programmed to, in response to an increase in magnitude of a difference between an operating duty cycle value of the switch and a predetermined duty cycle value at which a predicted ripple current magnitude and the switching frequency are at respective maximums, reduce the switching frequency to decrease the switching loss.

2. The variable voltage converter of claim 1 wherein the controller is further programmed to, in response to a decrease in the magnitude of the difference, increase the switching frequency to decrease ripple current magnitude.

3. The variable voltage converter of claim 1 wherein the controller is further programmed to, in response to the magnitude of the difference being less than a predetermined magnitude, set the switching frequency to the maximum switching frequency.

4. The variable voltage converter of claim 1 wherein the controller is further programmed to reduce the switching frequency by predetermined frequency steps based on the magnitude of the difference.

5. The variable voltage converter of claim 1 wherein the controller is further programmed to reduce the switching frequency in response to a decrease in a current input to the switch.

6. The variable voltage converter of claim 1 wherein the operating duty cycle is based on a ratio of an input voltage to an output voltage of the variable voltage converter.

7. The variable voltage converter of claim 1 wherein the controller is further programmed to limit the switching frequency to be between the maximum switching frequency and a predetermined minimum frequency.

8. The variable voltage converter of claim 7 wherein the predetermined minimum frequency is a frequency level that is greater than a predetermined switching frequency of an inverter that is coupled to an output of the variable voltage converter.

9. A variable voltage converter comprising:
   a switch having a switching loss that decreases as a switching frequency of the switch decreases; and
   a controller programmed to set the switching frequency to a predetermined maximum frequency when a current input to the switch is greater than a predetermined maximum current and, in response to the current input being less than the predetermined maximum current, reduce the switching frequency based on a magnitude of the current input.

10. The variable voltage converter of claim 9 wherein the controller is further programmed to reduce the switching frequency by predetermined frequency steps based on the magnitude of the current input.

11. The variable voltage converter of claim 9 wherein the controller is further programmed to reduce the switching frequency based on a magnitude of a difference between a duty cycle of the switch and a predetermined duty cycle value at which a ripple current magnitude and the switching frequency are at respective maximums.

12. The variable voltage converter of claim 9 wherein the switching frequency decreases as the magnitude of the current decreases.

13. The variable voltage converter of claim 9 wherein the current input is based on an input power to the variable voltage converter.

14. A method of controlling a vehicle variable voltage converter comprising:
   decreasing, by a controller, a frequency of a control signal for a switch to reduce switching losses in response to an increase in a magnitude of a difference between an operating duty cycle of the control signal and a predetermined duty cycle at which a predicted ripple component magnitude and the frequency are at respective maximums; and
   outputting, by the controller, the control signal.

15. The method of claim 14 further comprising increasing, by the controller, the frequency of the control signal toward the maximum frequency in response to a decrease in the magnitude of the difference to decrease a ripple component magnitude.

16. The method of claim 14 further comprising limiting, by the controller, the frequency to be between the maximum frequency and a predetermined minimum frequency.

17. The method of claim 16 wherein the predetermined minimum frequency is a frequency level that is greater than a predetermined switching frequency of an inverter that is coupled to an output of the voltage converter.

18. The method of claim 14 further comprising setting, by the controller, the frequency to the maximum frequency in response to the magnitude of the difference being less than a predetermined magnitude.

19. The method of claim 14 further comprising decreasing, by the controller, the frequency in response to a current input to the switch being less than a predetermined maximum current to reduce switching losses.

20. The method of claim 19 further comprising increasing, by the controller, the frequency in response to the current input increasing toward the predetermined maximum current to reduce a ripple component magnitude.

* * * * *